(12) United States Patent
Li et al.

(10) Patent No.: US 9,198,013 B2
(45) Date of Patent: Nov. 24, 2015

(54) IDENTIFYING BASE STATION TYPES

(71) Applicants: Verizon Patent and Licensing Inc., Basking Ridge, NJ (US); Cellco Partnership, Basking Ridge, NJ (US)

(72) Inventors: Mingxing S. Li, San Jose, CA (US); Ce Xu, San Ramon, CA (US); Xuming Chen, San Ramon, CA (US); Priscilla Lau, Fremont, CA (US); Peter Li, West Orange, NJ (US); Said Hanbaly, Annandale, NJ (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 149 days.

(21) Appl. No.: 13/898,926

(22) Filed: May 21, 2013

(65) Prior Publication Data
US 2014/0348008 A1    Nov. 27, 2014

(51) Int. Cl.
| | |
|---|---|
| H04W 80/04 | (2009.01) |
| H04W 24/00 | (2009.01) |
| H04W 4/22 | (2009.01) |
| H04W 88/08 | (2009.01) |
| H04W 4/02 | (2009.01) |
| H04W 64/00 | (2009.01) |
| H04W 84/04 | (2009.01) |

(52) U.S. Cl.
CPC . *H04W 4/22* (2013.01); *H04W 4/02* (2013.01); *H04W 64/00* (2013.01); *H04W 84/045* (2013.01); *H04W 88/08* (2013.01)

(58) Field of Classification Search
USPC ........... 370/328, 338; 455/456.1, 456; 705/26
See application file for complete search history.

(56) References Cited

U.S. PATENT DOCUMENTS

| | | | |
|---|---|---|---|
| 2009/0132675 A1* | 5/2009 | Horn et al. | 709/207 |
| 2011/0256824 A1* | 10/2011 | Futaki et al. | 455/3.01 |
| 2011/0312324 A1* | 12/2011 | Jin et al. | 455/435.1 |
| 2012/0157077 A1* | 6/2012 | Lee et al. | 455/419 |
| 2012/0252460 A1* | 10/2012 | Koskinen et al. | 455/438 |
| 2013/0157660 A1* | 6/2013 | Awad et al. | 455/435.1 |
| 2014/0092777 A1* | 4/2014 | Liu | 370/254 |
| 2014/0171048 A1* | 6/2014 | Sanaullah et al. | 455/416 |
| 2014/0269464 A1* | 9/2014 | Park et al. | 370/311 |
| 2014/0274029 A1* | 9/2014 | Radulescu et al. | 455/424 |

* cited by examiner

*Primary Examiner* — Andrew Lee (57) ABSTRACT

One or more devices may receive information that identifies a format of an identifier of a network device. The format of the identifier may indicate a portion of the identifier that identifies a type of the network device. The one or more devices may receive the identifier of the network device based on a user device connecting with the network device to communicate via the network device; determine the type of the network device connected to the user device based on the portion of the identifier and a format of the identifier that identifies the type of network device; and execute a processing instruction based on the type of network device connected to the user device.

20 Claims, 8 Drawing Sheets

| Location Determination Technique 440 ||
|---|---|
| Base Station Type | Location Technique |
| Macro cell | -SUPL<br>-Invoke GPS command on user device |
| Femto cell | Longtitude/lattitude coordinates associated with femto cell ID |

| Processing Instruction 450 ||
|---|---|
| Rule | Instruction |
| Base station = Femto cell<br>Call instruction = Emergency number | -Locate user device using femto cell location technique<br>-Determine nearest emergency dispatch facility<br>-Place call to nearest emergency dispatch facility |
| Base station = Macro cell<br>Call instruction = emergency number | -Locate user device using marco cell location technique<br>-Determine nearest emergency dispatch facility<br>-Place call to nearest emergency dispatch facility |
| Base station = Femto cell<br>Call instruction = #Pizza | -Locate user device using femto cell location technique<br>-Determine nearest pizza merchant<br>-Place call to nearest pizza merchant |
| Base station = Femto cell<br>Call instruction = #PizzaList | -Locate user device using femto cell location technique<br>-Determine list of nearest pizza merchants and associated promotions<br>-Provide list of pizza merchants to user device<br>-Provide promotions information to user device |

Fig. 6

IDENTIFYING BASE STATION TYPES

BACKGROUND

User devices sometimes connect with network devices, such as base stations, to access a network to send/receive telephone calls and/or send/receive other types of communications. The type of base station connected to the user device may be unknown to a service provider of the network, thereby preventing the service provider to process a communication based on the type of base station.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may allow a call processing system to identify a type of base station (e.g., a macro cell type base station, a micro cell type base station, a small cell type base station, a femto cell type base station, or some other type of base station) with which a user device connects (e.g., to access a network and the call processing system) based on an identifier associated with the base station. Based on the type of base station, the call processing system may process a call instruction for the user device or execute some other network-related instruction. For example, based on the type of base station connected to the user device, the call processing system may apply a policy to the connection between the user device and the base station, apply different billing rates to an account of the user device, provide indications for display on the user device that indicate the type of base station connected to the user device, or execute some other network-related instruction.

Figure 1:
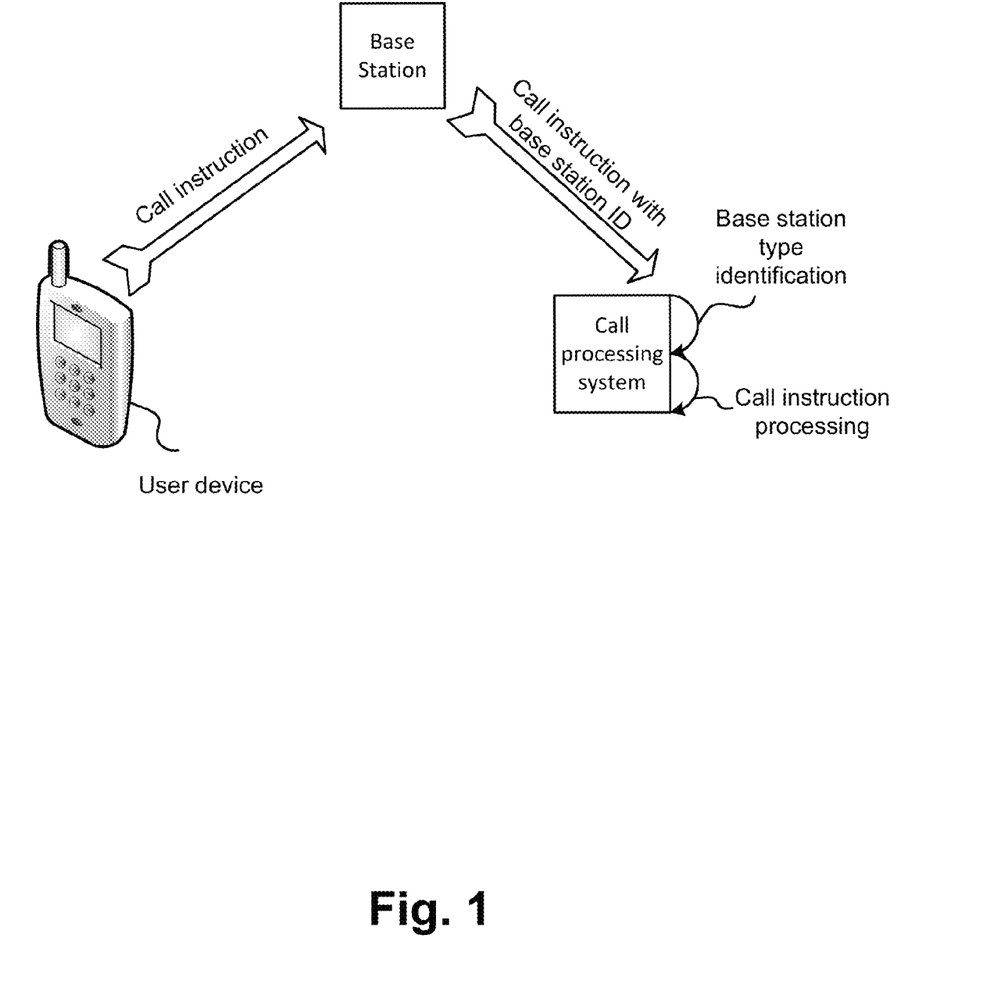
FIG. 1 illustrates an example overview of an implementation described herein.

FIG. 1 illustrates an example implementation, as described herein. In FIG. 1, assume that a call processing system stores format information that allows the call processing system to identify a type of base station based on a format of an identifier (ID) associated with the base station (e.g., an Evolved Universal Terrestrial Radio Access Network (E-UTRAN) Cell Global identifier (ECGI) or some other type of identifier). In some implementations, the identifier may include a quantity of bits and may have a format that identifies the type of the base station and/or some other information regarding the base station. For example, the first two bits of the identifier may include information that identifies the type of the base station whereas the remaining bits of the identifier may include information that identifies some other information regarding the base station. Alternatively, some other bit or bits of the identifier may include information that identifies the type of the base station.

As shown in FIG. 1, a user device may attach to a base station to access a call processing system to perform a task (e.g., access a web page, place a telephone call, etc.). For example, the user device may provide a call instruction that the call processing system may process on behalf of the user device (e.g., to allow the user device to perform the task). In some implementations, the call instruction may be received in the form of a text message, a dialed telephone number, and/or a packet-based message using an application of the user device.

As shown in FIG. 1, the base station may provide the call instruction to the call processing system (e.g., on behalf of the user device) and may provide an identifier of the base station with the call instruction to the call processing system. In some implementations, the call processing system may identify the type of base station based on the identifier and based on the format information.

In some implementations, the call processing system may process the call instruction based on the type of base station. For example, assume that the call instruction directs the user device to call a particular point of interest (POI) that is nearest to the geographic location (referred to as "location") of the user device (e.g., an emergency dispatch facility or merchant that sells a particular type of product). Given this assumption, the call processing system may locate the user device using a particular technique based on the type of base station connected to the user device. For example, the call processing system may locate the user device using a triangulation technique when the user device is connected to a macro cell type base station. Additionally or alternatively, the call processing system may locate the user device using longitude/latitude coordinates, associated with the base station, when the user device connects with a femto cell type base station (e.g., since the connection range of the femto cell type base station is within a particular threshold). Additionally or alternatively, the call processing system may or some other location determination technique based on the type of base station connected to the user device. In some implementations, the call processing system may process the call instruction by placing a telephone call, for the user device, to the nearest POI based on the geographic location of the user device.

As a result, the call processing system may identify base station types and may process a call instruction based on the base station type of the base station with which the user device connects. Further, analytics data may be stored to identify a quantity of user devices that are offloaded from a macro cell type base station to a femto cell type base station or other type of base station (e.g., to analyze the effectiveness and value of deploying femto cell type base stations to offload traffic from macro cell type base stations).

Figure 2:
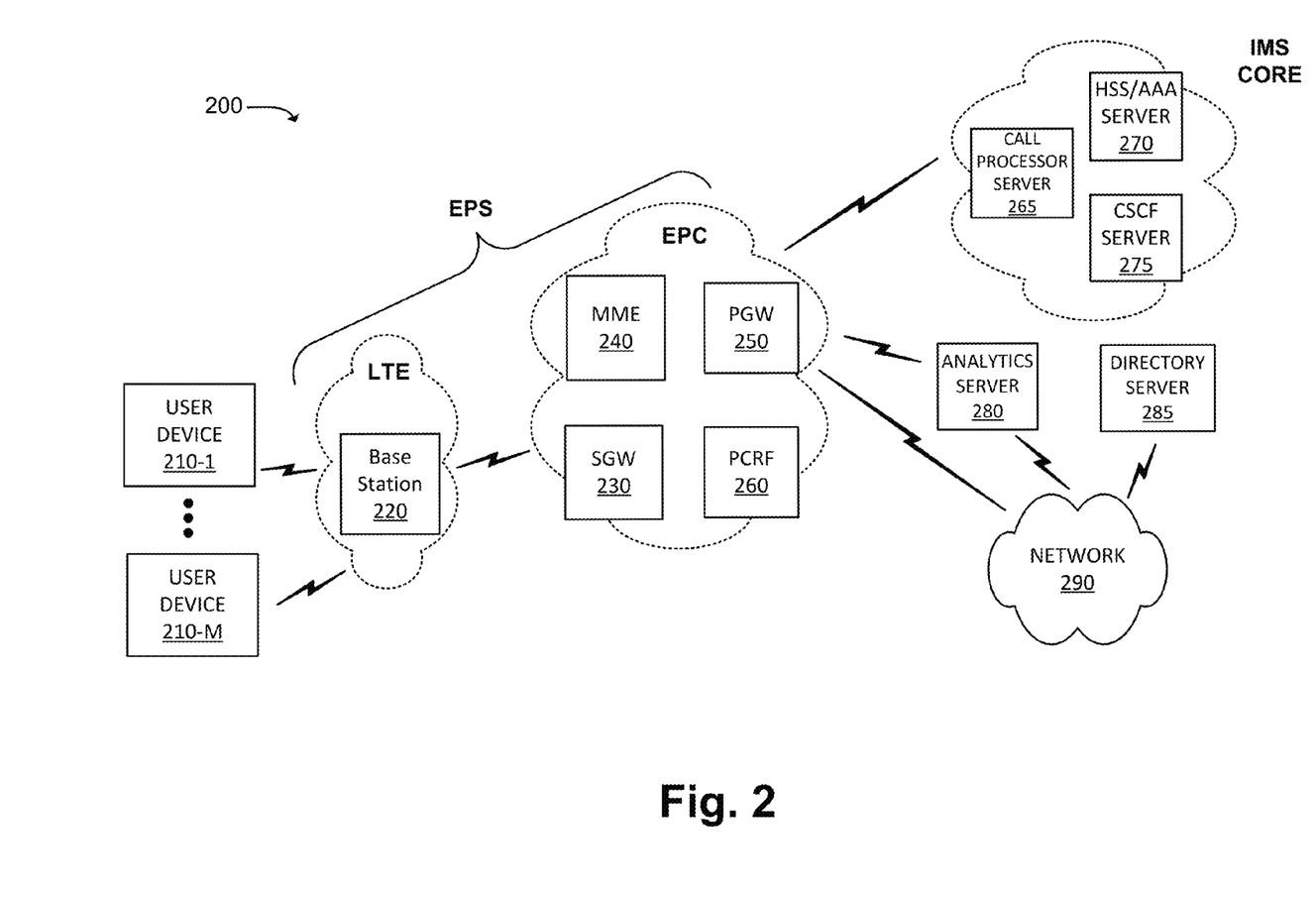
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, . . . , 210-M (where M≥1), a base station 220, a serving gateway 230 (referred to as "SGW 230"), a mobility management entity device 240 (referred to as "MME 240"), a packet data network (PDN) gateway (PGW) 250, a policy charging and rules function server 260 (referred to as "PCRF 260"), a call processing server 265, a home subscriber server (HSS)/authentication, authorization, accounting (AAA) server 270 (referred to as an "HSS/AAA server 270"), a call service control function (CSCF) server 275 (referred to as "CSCF server 275"), an analytics server 280, a directory server 285, and a network 290. The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2.

In some implementations, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, PGW 250, and/or PCRF 260 that enables user device 210 to communicate with network 290 and/or an Internet protocol (IP) multimedia subsystem (IMS) core. The IMS core may include call processing server 265, HSS/AAA server 270, and CSCF server 275 and may manage authentication, connection initiation, account information, a user profile, etc. associated with user device 210. As shown in FIG. 2, the LTE network may include base station 220. In some implementations, the EPC and IMS core may correspond to a call processing system as described in connection with FIG. 1.

User device 210 may include a computation or communication device, such as a wireless mobile communication device that is capable of communicating with base station 220 and/or a network (e.g., network 290). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 290.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 290 via SGW 230 and PGW 250. Base station 220 may send traffic to and/or receive traffic from user device 210 via an air interface. One or more of base stations 220 may be associated with a RAN, such as the LTE network. In some implementations, base station 220 may include a macro cell type base station, a micro cell type base station, a femto cell type base station, or some other type of base station.

In some implementations, base station 220 may have a particular connection range to service a particular geographic area. In some implementations, multiple base stations 220 may include a connection protocol that identify a particular base station 220 that may connect to user device 210 when the connection range of the multiple base stations 220 overlap. For example, base stations 220 may include a connection protocol that directs a femto cell type base station 220 to connect to user device 210 when user device 210 is in connection range of a femto cell type base station 220 and a macro cell type base station 220. Additionally or alternatively, the connection protocol may direct an under-loaded base station 220 to connect to user device 210 to alleviate an overloaded base station 220.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 290 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 270).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

PCRF 260 may include one or more network devices that store subscriber information, such as voice call and data rate plans or quotas for subscribers. PCRF 260 may provide network control regarding service data flow detection, gating, (Quality of Service) QoS, and/or flow based charging. Policies and rules regarding QoS may include policies and rules instructing user device 210 and/or network devices (e.g., base station 220, SGW 230, MME 240, PGW 250, etc.) to minimize packet loss, to implement a packet delay budget, to provide a guaranteed bit rate (GBR), to provide a particular latency, and/or to perform other activities associated with QoS. PCRF 260 may provide policies and rules to other network devices, such as HSS/AAA server 260 and/or PGW 250, to implement network control. PCRF 260 may determine how a certain service data flow shall be treated, and may ensure that user plane traffic mapping and QoS is in accordance with a user's profile and/or network policies.

In some implementations, SGW 230, MME 240, PGW 250, and/or PCRF 260 may apply and/or enforce connection policies and/or QoS treatments based on a type of base station 220 connected to user device 210.

Call processor server 265 may include one or more computing devices, such as a server device or a collection of server devices. In some implementations, call processor server 265 may store base station ID information that may be used to identify a type of base station 220 with which user device 210 connects. For example, call processor server 265 may receive a base station ID from user device 210 and/or base station 220 when user device 210 provides a call instruction. In some implementations, call processor server 265 may identify the type of base station based on the base station ID and process the call instruction based on the type of base station ID.

HSS/AAA server 270 may include one or more computing devices, such as a server device or a collection of server devices. In some implementations, HSS/AAA server 270 may manage, update, and/or store, in a memory associated with HSS/AAA server 270, profile information associated with user device 210 that identifies types of base stations 220 with which user device 210 connects. Additionally or alternatively, HSS/AAA server 270 may manage, update, and/or store profile information that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 270 may include a device that performs authentication, authorization, and/or accounting (AAA) operations associated with a communication connection with user device 210. In some implementations, HSS/AAA server 270 may apply different billing rates to an account of user device 210 based on the type of base station 220 connected to user device 210.

CSCF server 275 may include one or more computing devices, such as a server device or a collection of server devices. In some implementations, CSCF server 275 may process and/or route calls to and from user device 210 via the EPC. For example, CSCF server 275 may process calls, received from network 290, that are destined for user device 210. In another example, CSCF server 275 may process calls, received from user device 210, that are destined for network 290.

Analytics server 280 may include one or more computing devices, such as a server device or a collection of server devices. In some implementations, analytics server 280 may receive analytics information that identifies types of base stations 220 with which user devices 210 connect (e.g., based on information stored by HSS/AAA server 270). In some implementations, the analytics information may be used to identify a quantity of user devices 210 that are offloaded from a macro cell type base station 220 to a micro type base station 220 (e.g., to analyze the effectiveness and value of deploying micro type base stations 220 to offload traffic from macro cell type base stations 220).

Additionally or alternatively, the analytics information may be used to build a connection profile for user device 210 to analyze network usage by user device 210 by base station type. In some implementations, a network service plan may be offered to a user of user device 210 based on the usage of different types of base stations 220 by user device 210. For example, the network service plan may offer to provide a particular amount of network usage (e.g., in bytes of data transferred to/from user device 210) when user device 210 connects to a femto cell type base station 220. Additionally or alternatively, the network service plan may offer to provide another amount of network usage when user device 210 connects to a macro cell type base station 220.

Directory server 285 may include one or more computing devices, such as a server device or a collection of server devices. In some implementations, directory server 285 may store information that identifies location information (e.g., longitude and latitude coordinates, a street address, or the like) associated with a particular base station 220 (e.g., a femto cell type base station 220, a micro type base station 220, or some other type of base station 220 having a connection range below a particular threshold). Additionally or alternatively, directory server 285 may store information associated with a POI (e.g., an emergency dispatch facility, a merchant, a service provider, or the like). For example, directory server 285 may store location information, telephone information, and/or some other information that call processor server 265 may use to process a call instruction (e.g., when the call instruction includes an instruction to call a POI based on the location of user device 210).

Network 290 may include one or more wired and/or wireless networks. For example, network 290 may include a cellular network, a public land mobile network (PLMN), a second generation (2G) network, a third generation (3G) network, a fourth generation (4G) network, a fifth generation (5G) network, and/or another network. Additionally, or alternatively, network 290 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
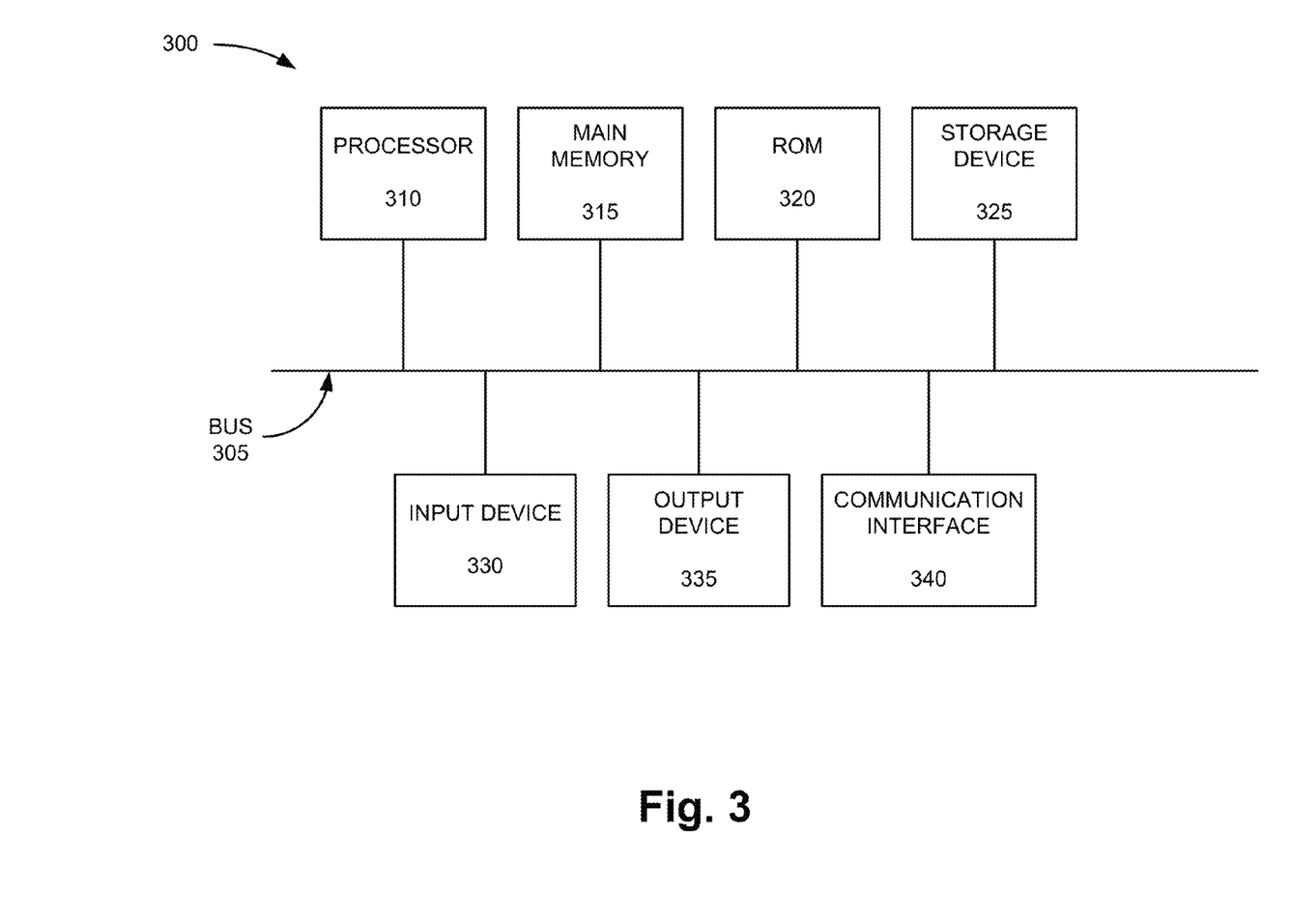
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, PGW 250, PCRF 260, call processing server 265, HSS/AAA server 270, CSCF server 275, analytics server 280, and/or directory server 285. Each of user device 210, base station 220, SGW 230, MME 240, PGW 250, PCRF 260, call processing server 265, HSS/AAA server 270, CSCF server 275, analytics server 280, and/or directory server 285 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

FIGS. 4A-4F illustrate an example data structure 400 that may be stored by one or more devices in environment 200. In some implementations, data structure 400 may be stored in a memory of call processor server 265. In some implementations, data structure 400 may be stored in a memory separate from, but accessible by, call processor server 265. In some implementations, data structure 400 may be stored by some other device in environment 200, such as user device 210, base station 220, SGW 230, MME 240, PGW 250, PCRF 260, HSS/AAA server 270, CSCF server 275, analytics server 280, and/or directory server 285.

A particular instance of data structure 400 may contain different information and/or fields than another instance of data structure 400. In some implementations, data structure 400 may store information identifying a format of a base station identifier that call processor server 265 may use to determine a type of base station connected to user device 210. Additionally or alternatively, data structure 400 may store information identifying location techniques that call processor server 265 may use to determine a location of user device 210 based on the type of base station 220 connected to user device 210. Additionally or alternatively, data structure 400 may store information identifying a processing instruction that call processor server 265 may execute based on the type of base station connected to user device 210 and based on a call instruction provided by user device 210.

As shown in FIGS. 4A-4F, data structure 400 may include bit frame field 410, bit value field 420, base station identification field 430, location determination technique field 440, and processing instruction field 450.

Figure 4A:
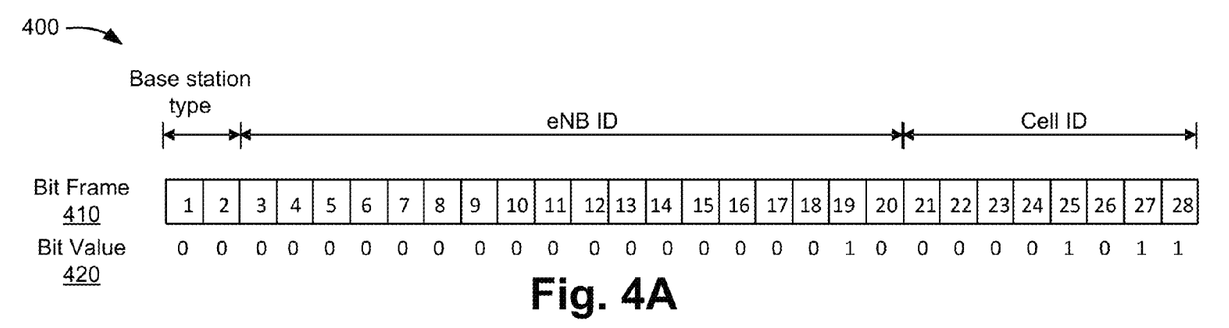
FIGS. 4A-4F illustrate an example data structure that may be stored by one or more devices in the environment of FIG. 2.

Bit frame field 410 may include information identifying a particular bit associated with a base station identifier. For example, as shown in FIG. 4A, the base station identifier may be 28 bits in length. In some implementations, the base station identifier may have some other length. As shown in FIG. 4A, each bit frame may include a particular bit value as shown in bit value field 420. In some implementations, particular bit frames may store bit values that identify a type of base station 220 associated with the base station identifier. For example, the bit values stored by the first two bit frames may indicate the type of base station 220. The bit values stored by bit frames 3-20 may indicate some other information relating to base station 220 (e.g., an eNB ID). The bit values for frames 21-28 may indicate some other information relating to base station 220 (e.g., an identifier of a cell, associated with base station 220, such as a cell ID). In FIGS. 4A-4E, assume that the bit values "00" indicate a macro cell type base station 220 and that the bit values "01" indicate a femto cell type base station 220 (e.g., when the bit values are stored by bit frames that indicate the base station type). Given these assumptions, call processor server 265 may identify a macro cell type base station 220 based on the base station identifier shown in FIG. 4A (e.g., since the bit frames that indicate the base station type store the bit values "00." In some implementations, the format of the base station identifier may vary from what is shown in FIG. 4A.

Figure 4B:
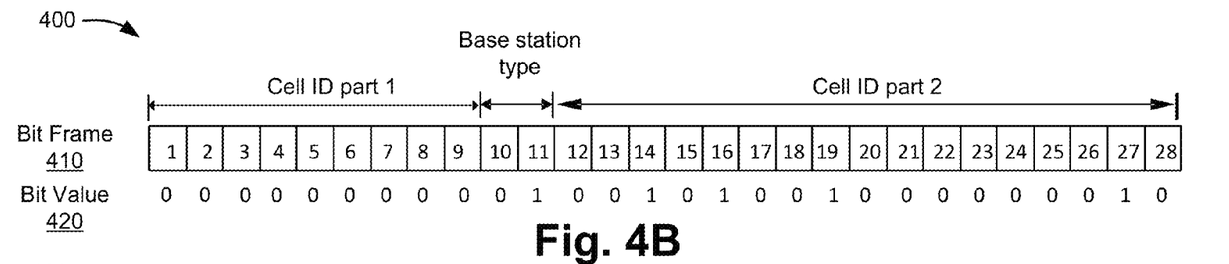
Figure 4C:
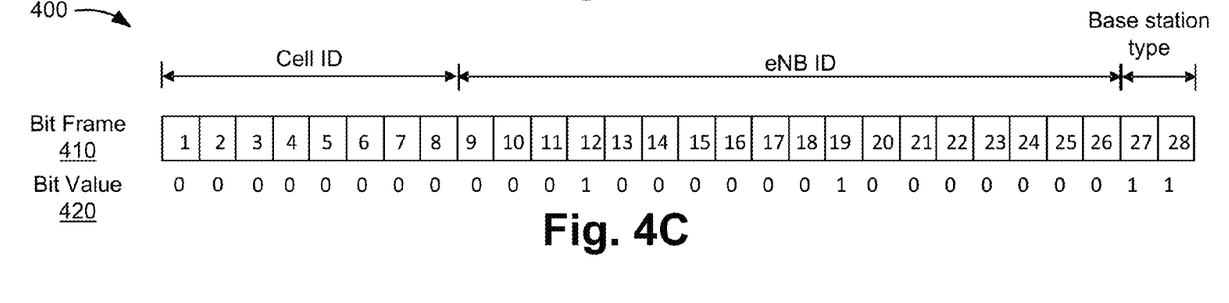

For example, referring to FIG. 4B, bit values stored by bit frames 10-11 may indicate the base station type. As further shown in FIG. 4B, bit frames 1-9 may store bit values identifying a first portion of a cell ID while bit frames 12-28 may store bit values identifying a second portion of the cell ID. In some implementations, call processor server 265 may identify a femto cell type base station 220 based on the base station identifier shown in FIG. 4B (e.g., since the base station type is identified by the bit values "01"). In some implementations, other bit frames may store bit values that identify the base station type. For example, referring to FIG. 4C, the final bit frames of the bit identifier may store bit values that indicate the base station type. As shown in FIG. 4C, the bit frames 27-28 may store bit values that indicate the base station type.

Figure 4D:
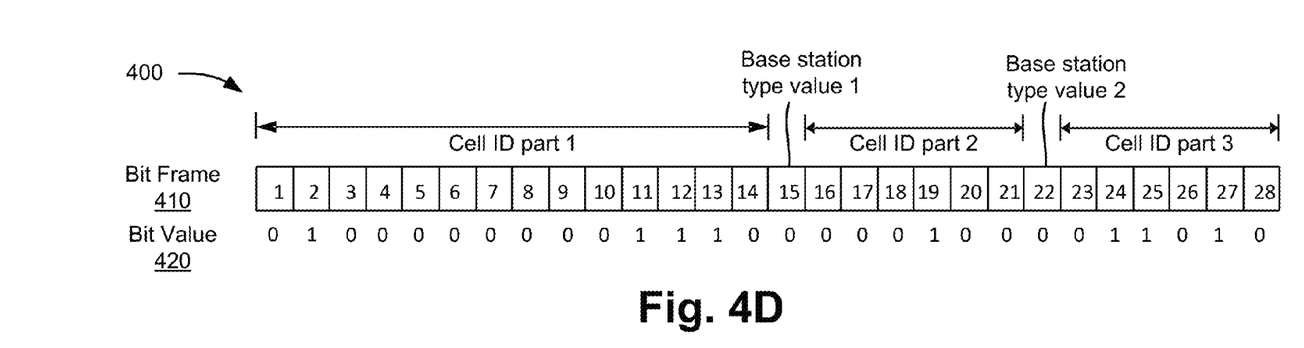

In some implementations, the bit values that identify the base station type may be stored in bit frames that are not contiguous (i.e. non-adjacent). For example, referring to FIG. 4D, a first bit value that identifies that base station type may be stored by bit frame 15 while a second bit value that identifies the base station type may be stored by bit frame 22. In the example of FIG. 4D, call processor server 265 may identify the base station type based on the bit values "0" and "1." In some implementations, the base station identifier may include any number of bit frames and have any number of bit frames that may identify the base station type.

In some implementations, each format of the base station ID shown in FIGS. 4A-4D may include a particular identifier, such as a format ID. In some implementations, different user devices 210 may be associated with different format IDs (e.g., based on a user device ID of user device 210). That is, call processor server 265 may use a particular format of the base station ID (e.g., the format shown in FIG. 4A) to identify the type of base station 220 connected to one user device 210, and may use another format of the base station ID (e.g., the format shown in FIG. 4B) to identify the type of base station 220 connected to another user device 210.

While FIGS. 4A-4D illustrate that two bit frames in a base station identifier may identify the base station type, in practice, any number of bit frames may be used to identify the base station type. Also, a particular set of bit values in a base station identifier may be associated with a particular base station type. As an example, bit values 0001-1000 may be associated with a femto cell type, whereas bit values and 1001-10000 may be associated with a macro cell type base station. Also, one or more decimal ranges, associated with bit values, may indicate the base station type (e.g., 0.000001-0.100001 may indicate a femto cell type base station). Further, data structure 400 may store multiple base station identifiers associated with a particular base station type.

Figure 4E:
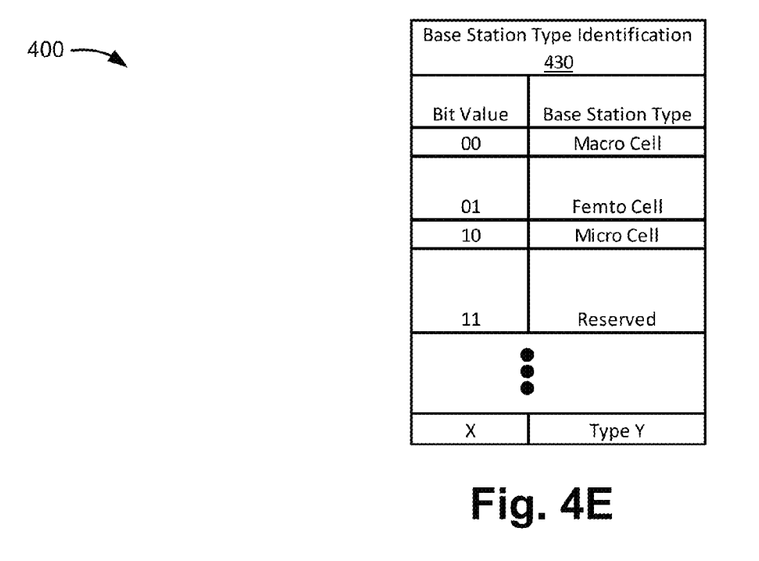

Referring to FIG. 4E, base station identification field 430 may store information that identifies the base station type based on bit values. As shown in FIG. 4E, base station identification field 430 may identify that the bit values "00" correspond to a macro cell type base station 220, the bit values "01" may correspond to the femto cell type base station 220, and the bit values "10" may correspond to the micro cell type base station 220. In some implementations, base station identification field 430 may store any number of bit values to identify any number of base station types. In some implementations, different bit values may correspond to different base station types for different user devices 210 (e.g., based on the user device ID of user device 210). That is, the bit values "00" may correspond to a macro cell type base station 220 for one user device 210, whereas the bit values "00" may correspond to a femto cell type base station for another user device 210.

Figure 4F:
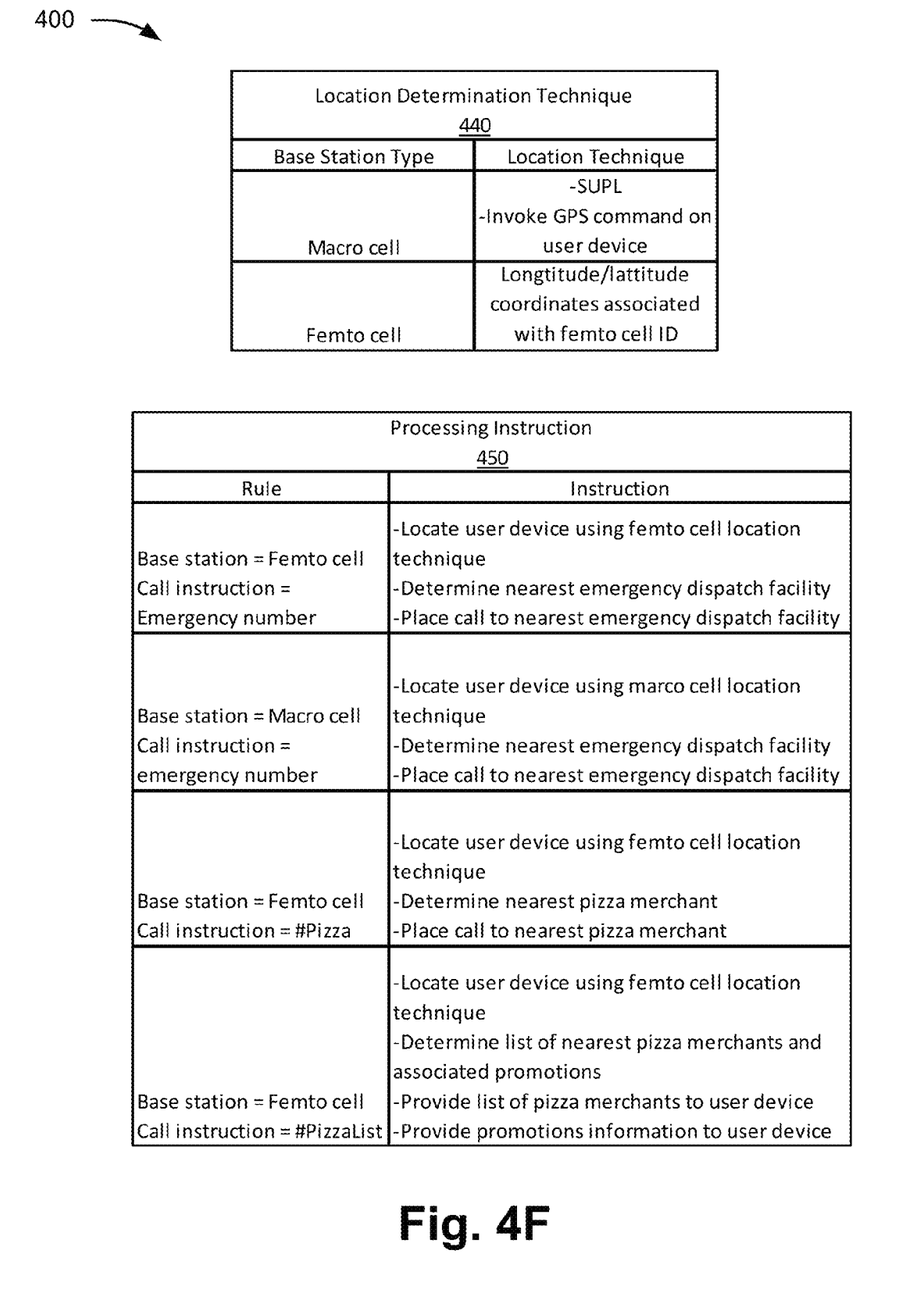

Referring to FIG. 4F, location determination technique field 440 may store information that identifies a location determination technique that call processor server 265 may use to identify a location of user device 210 based on the type of base station 220 that is connected to user device 210. For example, for a user device 210 that is connected to a macro cell type base station 220 (or a base station 220 having a connection range above a particular threshold), location determination technique field 440 may include information to direct call processor server 265 to use a secure user plane location (SUPL) to locate user device 210 via an internet protocol. Additionally or alternatively, location determination technique field 440 may include information to direct call processor server 265 to use triangulation techniques to locate user device 210. Additionally, or alternatively, location determination technique field 440 may include information to direct call processor server 265 to invoke a global positioning system (GPS) device on user device 210 to receive location information of user device 210 (e.g., longitude and latitude coordinates, a street address, and/or some other information that identifies the location of user device 210).

As further shown in FIG. 4F (e.g., for a user device 210 that is connected to a femto cell type base station 220 or some other type of base station 220 having a connection range below a particular threshold), location determination technique field 440 may include information to direct call processor server 265 to determine the location of user device 210 based on location information associated with base station 220 (e.g., longitude and latitude coordinates, a street address, and/or some other information that identifies the location of base station 220). For example, call processor server 265 may determine the longitude and latitude coordinates of base station 220 based on a cell ID portion of the base station ID of base station 220 and based on information stored by directory server 285 that identifies the longitude and latitude coordinates associated with the cell ID. As a result, call processor server 265 may determine the location of user device 210 without performing triangulation techniques or other processes that may strain user device 210 (e.g., when user device 210 is connected to a femto cell type base station 220).

As described above, call processor server 265 may process a call instruction based on the base station type. For example, processing instruction field 450 may include information that identifies how call processor server 265 may process a particular call instruction based on the type of base station 220 with which user device 210 connects. As described above, the call instruction may be received in the form of a text message, a dialed telephone number, and/or in the form of a packet-based message using an application of user device 210.

As shown in FIG. 4F, processing instruction field 450 may store a rule having criteria for a call instruction and a corresponding instruction when the criteria are met. As an example, processing instruction field 450 may store criteria, such as "base station=femto cell" and "call instruction=emergency number." Further, processing instruction field 450 may store an instruction that call processor server 265 may execute to process a call instruction when the criteria of the call instruction are met. For example, when the corresponding criteria are met (e.g., when call processor server 265 receives a call instruction to call an emergency number from a user device 210 that is connected to a femto cell type base station 220), processing instruction field 450 may store an instruction to direct call processor server 265 to locate user device 210 using the location technique for femto cell type base stations 220 indicated by location determination technique field 440.

Further, processing instruction field 450 may store an instruction to direct call processor server 265 to determine the nearest emergency dispatch facility (e.g., based on the location of user device 210 and based on information stored by directory server 285) and to place a call to the emergency dispatch facility (e.g., by communicating with CSCF server 275 to place the call). For example, call processor server 265 may provide a search query to directory server 285 with the search value "emergency dispatch, [location]," where [location] includes information identifying the location of user device 210 (e.g., a street address, longitude/latitude coordinates, and/or some other information that identifies location). In some implementations, directory server 285 may provide a response to the search query that includes information regarding the emergency dispatch facility closest to the location of user device 210 (e.g., a street address, a telephone number, a routing protocol used to route call to the emergency dispatch facility, etc.).

As another example, processing instruction field 450 may store a rule having the criteria "base station=macro cell" and "call instruction=emergency number." Processing instruction field 450 may store corresponding instructions to direct call processor server 265 (e.g., when call processor server 265 receives a call instruction meeting the criteria), to locate user device 210 using a particular location technique for user devices 210 connected to a macro cell type base station (e.g., based on information stored by location determination technique field 440). Further, processing instruction field 450 may store an instruction to direct call processor server 265 to determine the nearest emergency dispatch facility (e.g., based on the location of user device 210 as determined using the particular location determination technique) and to place a call to the nearest emergency dispatch facility.

As another example, processing instruction field 450 may store a rule having the criteria "base station=femto cell" and "call instruction=#PizzaList." Processing instruction field 450 may store corresponding instructions to direct call processor server 265 (e.g., when call processor server 265 receives a call instruction meeting the criteria) to locate user device 210 (based on the type of base station 220 connected to user device 210 and the location technique indicated by location determination technique field 440), determine a list of pizza merchants and a list of promotions associated with the pizza merchants, and provide the list if pizza merchants and the list of promotions to user device 210 for display on user device 210. For example, call processor server 265 may provide a search query to directory server 285 with the search value "pizza [location]," where [location] includes information identifying the location of user device 210." In some implementations, directory server 285 may provide a response to the search query that includes information regarding a list of a particular number of pizza merchants within a particular threshold distance of the location of user device 210.

In some implementations, the particular number of merchants in the list and the particular threshold distance may be based on user preference information stored by HSS/AAA server 270 and/or based on some other information included in the call instruction. For example, the call instruction may identify the particular number of merchants and/or the threshold distance.

As another example, processing instruction field 450 may store a rule having the criteria "base station=femto cell" and "call instruction=#Pizza." Processing instruction field 450 may store corresponding instructions to direct call processor server 265 (e.g., when call processor server 265 receives a call instruction meeting the criteria) to locate user device 210 using a particular location determination technique (e.g., based on the type of base station 220 connected to user device 210 and the particular location technique indicated by location determination technique field 440). Processing instruction field 450 may further store an instruction to direct call processor server 265 to determine the nearest pizza merchant (e.g., based on a location of user device 210 determined using the particular location determination technique) and to place a call to the nearest pizza merchant.

While particular fields are shown in a particular format in data structure 400, in practice, data structure 400 may include additional fields, fewer fields, different fields, or differently arranged fields than are shown in FIGS. 4A-4F. For example, data structure 400 may store information that identifies a policy and/or a QoS treatment to apply to a connection between user device 210 and devices in environment 200 based on the type of base station 220 connected to user device 210. Additionally or alternatively, data structure 400 may store information that identifies billing rates to apply to an account of user device 210 based on the type of base station 220 connected to user device 210. Additionally or alternatively, data structure 400 may store analytics information that identifies network load offloaded from a macro cell type cell base station 220 to a femto cell type cell base station 220. Additionally or alternatively, data structure 400 may store additional information related to a base station identifier, such as a mobile country code (MCC), a mobile network code (MNC), and/or some other information.

Figure 5:
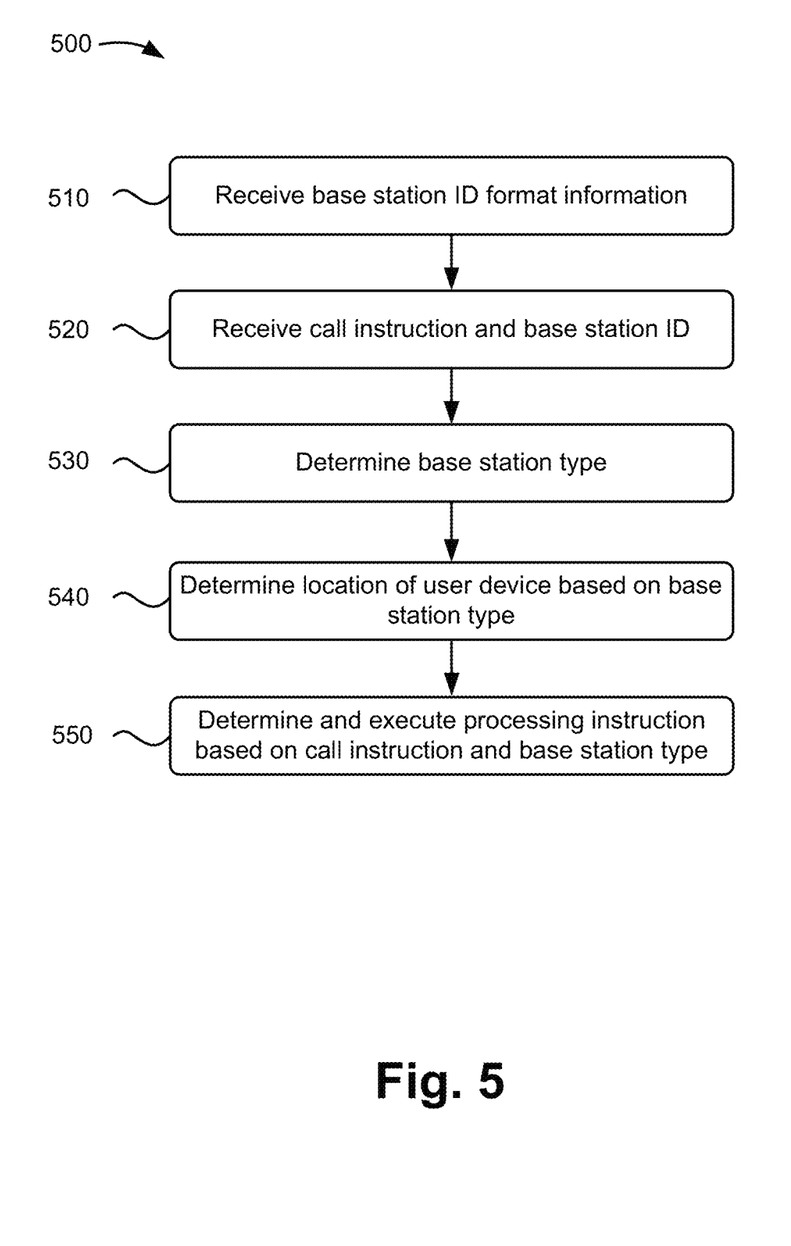
FIG. 5 illustrates a flowchart of an example process for processing a call instruction based on a type of base station with which a user device connects.

FIG. 5 illustrates a flowchart of an example process for processing a call instruction based on a type of base station 220 with which user device 210 connects. In one implementation, process 500 may be performed by one or more components of call processor server 265. In another implementation, some or all of blocks of process 500 may be performed by one or more components of another device in environment 200 (e.g., user device 210, base station 220, SGW 230, MME 240, PGW 250, PCRF 260, HSS/AAA server 270, CSCF server 275, analytics server 280, and/or directory server 285), or a group of devices including or excluding call processor server 265.

As shown in FIG. 5, process 500 may include receiving base station ID format information (block 510). For example, call processor server 265 may receive the base station ID format information from an operator of call processor server 265. In some implementations, the base station ID format information may identify the format of the base station ID and may identify particular bit frames of the base station ID that indicate the type of base station 220 associated with the base station ID (e.g., as described above with respect to FIGS. 4A-4D). In some implementations, the base station ID format information may also be provided to base stations 220 such that base stations 220 may each format respective base station IDs in accordance with the base station ID format information.

Process 500 may also include receiving a call instruction and a base station ID (block 520). For example, call processor server 265 may receive a call instruction from user device 210, via base station 220, and the base station ID from the base station 220 connected to user device 210 (e.g., when base station 220 provides the call instruction to call processor server 265). In some implementations, the call instruction may be received in the form of a text message, a dialed telephone number, and/or in the form of a packet-based message using an application of the user device. In some implementations, call processor server 265 may receive the base station ID without receiving the call instruction. For example, base station 220 may provide the base station ID to call processor server 265 when user device 210 connects with base station 220, such as when user device 210 enters a connection range of user device 210.

Process 500 may further include determining a base station type (block 530). For example, call processor server 265 may determine the type of base station 220 connected to user device 210 based on the base station ID and the format information of the base station ID. Some examples of determining the type of base station 220 connected to user device 210 are described above with respect to FIGS. 4A-4D.

Process 500 may also include determining the location of the user device based on the base station type (block 540). For example, call processor server 265 may determine the location of user device 210 using a particular location determination technique based on the type of base station 220 connected to user device 210. Some examples of determining the location of user device 210 using a particular location determination technique are described above with respect to FIG. 4F.

Process 500 may further include determining and executing a processing instruction based on the call instruction and the base station type (block 550). For example, call processor server 265 may determine the processing instruction when criteria are met (e.g., based on information stored by processing instruction field 450). Call processor server 265 may execute the processing instruction based on determining the processing instruction. Some examples of determining and executing a processing instruction are described above with respect to FIG. 4F.

As described above with respect to block 520, call processor server 265 may receive the base station ID without receiving the call instruction, such as when base station 220 connects to user device 210. As a result, call processor server 265 may identify the location of user device 210 based on the base station type and may store the location of user device 210 such that call processor server 265 may process a call instruction received at a later time after the location of user device 210 has been determined. Further, call processor server 265 may provide an indication to user device 210 for display that identifies information regarding the base station 220 connected to user device 210 (e.g., the type of base station 220, a billing rate associated with usage of base station 220, etc.). In some implementations, call processor server 265 may provide the indication to user device 210 without receiving a call instruction from user device 210 (e.g., when call processor server 265 receives a base station ID from base station 220 when user device 210 connects to base station 220, such as when user device 210 enters a connection range of base station 220).

While a particular series of blocks has been described above with regard to FIG. 5, the operations, data flows, and/or the order of the blocks may be modified in other implementations. Further, non-dependent operations and/or data flows may be performed in parallel. As described above, some portions of process 500 may be performed by some other device in environment 200. For example, SGW 230, MME 240, PGW 250, and/or PCRF 260 may receive base station ID format information and a base station ID to identify a base station type to apply different QoS treatments or different policies based on the base station type. Alternatively, call processor server 265 may provide SGW 230, MME 240, PGW 250, and/or PCRF 260 with information identifying the base station type.

In some implementations, HSS/AAA server 270 may use the information identifying the base station type to apply different billing rates to an account of user device 210 (e.g., apply one billing rate when user device 210 is connected to a macro cell type base station and apply another billing rate when user device 210 is connected to a femto cell type base station). In some implementations, analytics server 280 may use the information identifying the base station type to analyze the effectiveness of femto cells offloading network load from macro cells (e.g., to plan for deployment of additional femto cells to alleviate overloaded macro cells to plan for decommissioning of under-loaded femto cells). In some implementations, HSS/AAA server 270 and/or analytics server 280 may receive base station ID format information and a base station ID to identify a base station type. Alternatively, call processor server 265 may provide HSS/AAA server 270 and/or analytics server 280 with information identifying the base station type.

Figure 6:
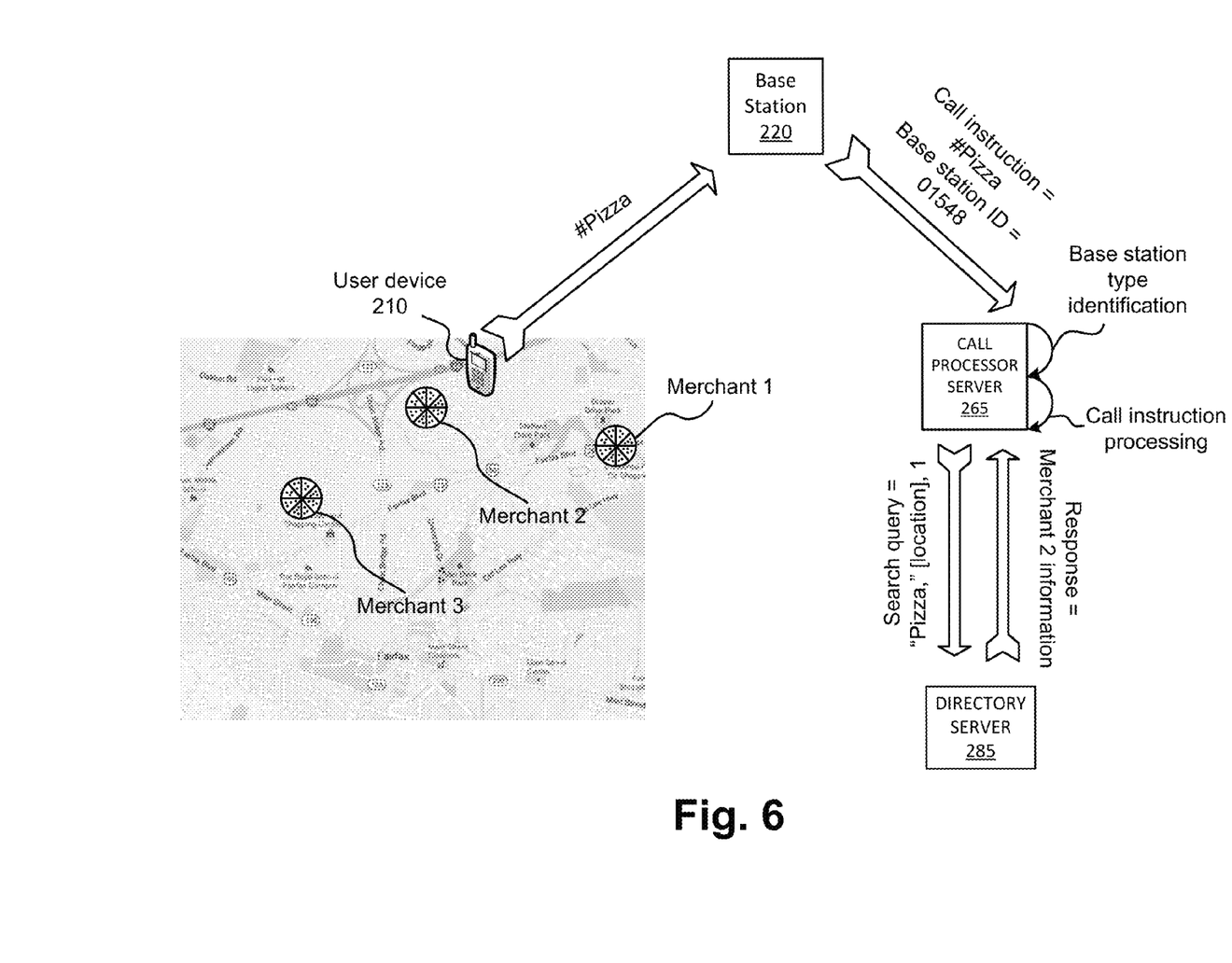
FIG. 6 illustrates an example implementation as described herein.

FIG. 6 illustrates an example implementation as described herein. In FIG. 6, assume that user device 210 is located at a particular location as shown. Further, assume that user device 210 connects to a femto cell type base station 220 to provide a call instruction for processing by call processor server 265. As shown in FIG. 6, user device 210 may provide a call instruction, such as "#Pizza" (e.g., via dialing a particular dialing sequence on a keypad of user device 210, via a text message, via a packet-based message using an application on user device 210, or via some other technique). In FIG. 6, assume that the call instruction causes call processor server 265 to place a call for user device 210 to the nearest merchant that sells pizza. Further, assume that three pizza merchants are within a particular range of user device 210 (e.g., as shown in FIG. 6). Further, assume that merchant 2 is closest to user device 210.

As shown in FIG. 6, call processor server 265 may receive the call instruction and may receive a base station ID associated with base station 220. In some implementations, call processor server 265 may identify the type of base station 220 and may process the call instruction (e.g., in accordance with process 500 as described above). For example, call processor server 265 may locate user device 210 using a location determination technique based on the type of base station 220 (e.g., a particular location determination technique for femto cell type base stations as identified in location determination technique field 440). In some implementations, call processor server 265 may use the particular location determination technique for a femto cell type base station 220 to determine the location of user device 210 based on location information associated with base station 220 (e.g., longitude and latitude coordinates, a street address, and/or some other information that identifies the location of base station 220). For example, call processor server 265 may determine the longitude and latitude coordinates of base station 220 based on a cell ID portion of the base station ID of base station 220 and based on information stored by directory server 285 that identifies the longitude and latitude coordinates associated with the cell ID.

Further, call processor server 265 may provide a search query to directory server 285, such as "Pizza," [location, 1]. In some implementations, the search query may direct directory server 285 to search for the nearest merchant (e.g., as indicated by the value 1), with respect to the location of user device 210, that is categorized as a merchant that sells pizza. In some implementations, the search query may have some other form, such as "Pizza," [location, 5] to direct directory server 285 to search for the 5 nearest pizza merchants (e.g., as indicated by the value 5). As shown in FIG. 6, the directory server may provide a response to call processor server 265, such as a response that identifies information associated with merchant 2 (e.g., the closest pizza merchant to user device 210). Additionally or alternatively, the response may include a list of pizza merchants such that call processor server 265 may determine the nearest pizza merchant to user device 210. In some implementations, call processor server 265 may communicate with CSCF server 275 to place a call for user device 210 to merchant 2.

In some implementations, call processor server 265 may communicate with CSCF server 275 to place a call to a merchant based on a direction of travel of user device 210. For example, assume that call processor server 265 is traveling towards merchant 1 and away from merchant 2 (e.g., based on identifying that user device 210 disconnects from a particular base station 220 and connects to another base station 220 that is in the direction toward merchant 1). Given this assumption, call processor server 265 may process the call instruction by placing a call to merchant 1.

While a particular example is shown in FIG. 6, it will be apparent that the above description is merely an example implementation and call processor server 265 may process a call instruction based on some other criteria not described above.

As described above, call processor server 265 may identify a type of base station 220 connected to user device 210 and may process a call instruction based on the base station type. Additionally or alternatively, call processor server 265 may provide indications for display on user device 210 that indicate the type of base station 220 connected to user device 210, billing rates associated with base station 220, etc. Further, analytics data may be stored by analytics server 280 to identify a number of user devices 210 that are offloaded from a macro cell type base station 220 to a femto cell type base station 220 or some other type of base station 220 (e.g., to analyze the effectiveness and value of deploying femto cell type base stations 220 to offload traffic from macro cell type base stations 220).

In some implementations, SGW 230, MME 240, PGW 250, and/or PCRF 260 may identify the base station type to apply a policy or QoS treatment to the connection between user device 210 and devices in, or communicating via, environment 200. Additionally or alternatively, HSS/AAA server 270 may identify the base station type to apply different billing rates to an account associated with user device 210.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by one or more devices, information that identifies a format of an identifier of a network device,
the format of the identifier indicating one or more bits of the identifier that identifies a type of the network device;
receiving, by the one or more devices, the identifier of the network device based on a user device connecting with the network device;
determining, by the one or more devices, the type of the network device connected to the user device based on a bit value stored by the one or more bits, of the identifier that identifies the type of the network device, as indicated by the format of the identifier;
receiving, by the one or more devices, a call instruction,
the call instruction directing the one or more devices to identify a point of interest (POI) based on a location of the user device;
determining, by the one or more devices, a processing instruction based on the call instruction and the type of the network device,
the processing instruction being associated with the POI; and
executing, by the one or more devices, the processing instruction based on the type of the network device connected to the user device.

2. The method of claim 1, further comprising:
identifying the POI based on the location of the user device,
where executing the processing instruction includes providing information regarding the POI to the user device or placing a call to the POI for the user device.

3. The method of claim 1, where the processing instruction directs the one or more devices to determine the location of the user device based on the type of the network device, and
where executing the processing instruction includes determining the location of the user device based on the type of the network device.

4. The method of claim 3, where determining the location of the user device includes determining the location of the user device based on a particular location determination technique,
the particular location determination technique being based on the type of the network device,
the particular location determination technique being based on one or more of: a secure user plane location (SUPL) protocol, longitude and latitude coordinates associated with the network device, or global positioning system (GPS) coordinates provided by the user device.

5. The method of claim 1, where the processing instruction directs the one or more devices to apply a quality of service (QoS) treatment or policy to a connection associated with the user device, and
where executing the processing instruction includes applying the QoS treatment or policy to the connection associated with the user device.

6. The method of claim 1, where the processing instruction directs the one or more devices to apply a particular billing rate to an account of the user device based on the type of the network device connected to the user device, and
where executing the processing instruction includes applying the particular billing rate to the account of the user device based on the type of the network device connected to the user device.

7. The method of claim 1, where the processing instruction directs the one or more devices to store analytics information that identifies a measure of network load offloaded from the network device, and
where executing the processing instruction includes storing the analytics information.

8. The method of claim 1, where the type of the network device includes a macro cell network device, a micro cell network device, a femto cell network device, or an eNodeB network device.

9. A system comprising:
one or more devices, comprising one or more memories and one or more processors, to:
receive information that identifies a format of an identifier of a network device,
the format of the identifier indicating a portion of the identifier that identifies a type of the network device;
receive the identifier of the network device based on a user device connecting with the network device to communicate via the network device;
determine the type of the network device connected to the user device based on the portion of the identifier, that identifies the type of the network device, as indicated by the format of the identifier;
receive a call instruction,
the call instruction directing the one or more devices to identify a point of interest (POI) based on a location of the user device;
determine a processing instruction, relating to the POI, based on the call instruction and the type of the network device; and
execute the processing instruction based on the type of the network device connected to the user device.

10. The system of claim 9, where the one or more devices are further to:
identify the POI based on the location of the user device,
where, when executing the processing instruction, the one or more devices are further to provide information regarding the POI to the user device or place a call to the POI for the user device.

11. The system of claim 9, where the processing instruction directs the one or more devices to determine the location of the user device based on the type of the network device, and where, when executing the processing instruction, the one or more devices are further to determine the location of the user device based on the type of the network device.

12. The system of claim 11, where, when determining the location of the user device, the one or more devices are further to determine the location of the user device based on a particular location determination technique,
the particular location determination technique being based on the type of the network device,
the particular location determination technique being based on one or more of: a secure user plane location (SUPL) protocol, longitude and latitude coordinates associated with the network device, or global positioning system (GPS) coordinates provided by the user device.

13. The system of claim 9, where the processing instruction directs the one or more devices to apply a quality of service (QoS) treatment or policy to a connection associated with the user device, and
where, when executing the processing instruction, the one or more devices are further to apply the QoS treatment or policy to the connection associated with the user device.

14. The system of claim 9, where the processing instruction directs the one or more devices to apply a particular billing rate to an account of the user device based on the type of the network device connected to the user device, and
where, when executing the processing instruction, the one or more devices are further to apply the particular billing rate to the account of the user device based on the type of the network device connected to the user device.

15. The system of claim 9, where the processing instruction directs the one or more devices to store analytics information that identifies a measure of network load offloaded from the network device, and
where, when executing the processing instruction, the one or more devices are further to store the analytics information.

16. A non-transitory computer-readable medium for storing instructions, the instructions comprising:
a plurality of instructions which, when executed by one or more processors associated with one or more devices, cause the one or more processors to:
receive information that identifies a format of an identifier of a base station,
the format of the identifier indicating one or more bits, of a plurality of bits, of the identifier that identify a type of the base station,
the one or more bits being arranged adjacent to each other or being arranged non-adjacent to each other;
receive the identifier of the base station based on a user device connecting with the base station to communicate with the one or more devices via the base station;
determine, based on the format of the identifier, the type of the base station connected to the user device based on the one or more bits, of the plurality of bits of the identifier, that identify the type of the base station;
receive a call instruction,
the call instruction directing the one or more devices to identify a point of interest (POI) based on a location of the user device;
determine a processing instruction, relating to the POI, based on the call instruction and the type of the base station; and
execute a processing instruction based on the type of the base station connected to the user device.

17. The non-transitory computer-readable medium of claim 16, where the instructions further comprise:
one or more instructions to identify the POI based on the location of the user device,
where one or more instructions, of the plurality of instructions, to execute the processing instruction, further cause the one or more processors to provide information regarding the POI to the user device or place a call to the POI for the user device.

18. The non-transitory computer-readable medium of claim 16, where the processing instruction directs the one or more devices to determine the location of the user device based on the type of the base station, and
where one or more instructions, of the plurality of instructions, to execute the processing instruction further cause the one or more processors to determine the location of the user device based on the type of the base station.

19. The non-transitory computer-readable medium of claim 18, where one or more instructions, of the plurality of instructions, to determine the location of the user device, further cause the one or more processors to determine the location of the user device based on a particular location determination technique,
the particular location determination technique being based on the type of the base station,
the particular location determination technique being based on one or more of: a secure user plane location (SUPL) protocol, longitude and latitude coordinates associated with the base station, or global positioning system (GPS) coordinates provided by the user device.

20. The non-transitory computer-readable medium of claim 16, where the processing instruction directs the one or more devices to apply a quality of service (QoS) treatment or policy to a connection associated with the user device, and
where one or more instructions, of the plurality of instructions, to execute the processing instruction further cause the one or more processors to apply the QoS treatment or policy to the connection associated with the user device.

* * * * *